United States Patent
Bloy (10) Patent No.: US 8,344,858 B2
(45) Date of Patent: Jan. 1, 2013

(54) STEERABLE PHASE ARRAY ANTENNA RFID TAG LOCATER AND TRACKING SYSTEM AND METHODS

(75) Inventor: Graham P. Bloy, St. Louis, MO (US)

(73) Assignee: RF Controls, LLC, St. Louis, MO (US)

( * ) Notice: Subject to any disclaimer, the term of this patent is extended or adjusted under 35 U.S.C. 154(b) by 472 days.

(21) Appl. No.: 12/675,527

(22) PCT Filed: Sep. 9, 2008

(86) PCT No.: PCT/IB2008/053643
§ 371 (c)(1),
(2), (4) Date: Feb. 26, 2010

(87) PCT Pub. No.: WO2009/034526
PCT Pub. Date: Mar. 19, 2009

(65) Prior Publication Data
US 2010/0207738 A1    Aug. 19, 2010

Related U.S. Application Data

(60) Provisional application No. 60/993,418, filed on Sep. 11, 2007.

(51) Int. Cl.
*H04Q 5/22* (2006.01)
*G08B 13/14* (2006.01)
*G06K 7/08* (2006.01)
*H04M 1/00* (2006.01)
*H04B 1/06* (2006.01)
*H01Q 3/00* (2006.01)

(52) U.S. Cl. .................. 340/10.3; 340/10.1; 340/572.1; 340/539.22; 235/451; 455/562.1; 455/272; 343/702

(58) Field of Classification Search .................. None
See application file for complete search history.

(56) References Cited

U.S. PATENT DOCUMENTS

| | | | |
|---|---|---|---|
| 5,648,767 A * | 7/1997 | O'Connor et al. | 340/928 |
| 6,393,045 B1 * | 5/2002 | Belcher et al. | 375/130 |
| 6,614,721 B2 * | 9/2003 | Bokhour | 367/128 |
| 7,257,418 B1 | 8/2007 | Chang et al. | |
| 7,583,179 B2 * | 9/2009 | Wu et al. | 340/10.1 |
| 7,667,646 B2 | 2/2010 | Kalliola et al. | |
| 7,692,585 B2 * | 4/2010 | Mohamadi | 342/368 |
| 7,873,326 B2 * | 1/2011 | Sadr | 455/67.16 |
| 2004/0069852 A1 * | 4/2004 | Seppinen et al. | 235/451 |
| 2005/0110674 A1 | 5/2005 | Mendolia et al. | |
| 2005/0159187 A1 * | 7/2005 | Mendolia et al. | 455/562.1 |
| 2005/0280504 A1 | 12/2005 | Pettus | |
| 2008/0012710 A1 * | 1/2008 | Sadr | 340/572.1 |
| 2008/0030422 A1 | 2/2008 | Gevargiz et al. | |
| 2009/0021374 A1 * | 1/2009 | Stagg | 340/572.1 |

OTHER PUBLICATIONS

Gonzalez Moreno, J: Extended European Search Report for EP application No. 08789680.9, European Patent Office, Apr. 12, 2011 (transmitted Apr. 19, 2011), Munich DE.

* cited by examiner

*Primary Examiner* — Jennifer Mehmood
*Assistant Examiner* — Fekadeselassie Girma
(74) *Attorney, Agent, or Firm* — Babcock IP, PLLC (57) ABSTRACT

A system for and method of tracking and locating RFID tags, including where at least one steerable phase array antenna may locate the tags associated with items in three dimensions in real time, through the use of a beam steering unit and controller therewith to control the direction of a beam launched by the at least one steerable phase array antenna.

7 Claims, 6 Drawing Sheets

STEERABLE PHASE ARRAY ANTENNA RFID TAG LOCATER AND TRACKING SYSTEM AND METHODS

CROSS REFERENCE TO RELATED APPLICATIONS

This application claims the benefit of U.S. Provisional Patent Application No. 60/993,418, titled "Steerable Phase Array Antenna RFID Tag Locator and Tracking System", filed by Graham P. Bloy on Sep. 11, 2007 and International Patent Application No.: PCT/IB2008/053643, titled "Steerable Phase Array Antenna RFID Tag Locater and Tracking System and Methods", filed by Graham P. Bloy on Sep. 9, 2008, both applications hereby incorporated by reference in their entirety.

FIELD OF THE INVENTION

The present invention relates to a steerable phase array antenna RFID tag locater and tracking system. More particularly, the system comprising at least one steerable phase array antenna, RFID reader and a controller to acquire, locate and track RFID tags.

BACKGROUND OF THE INVENTION

Conventional RFID readers can read tags at distances less than desired by the RFID tag user. Multiple RFID tags in a particular location or volume, such as a warehouse, are inherently difficult to locate or track. When RFID tags are in proximity to one another (the proximity varying, for example, due to RFID tag type or conditions within the space in which they are located or conditions in the surrounding space or both), that is a multipath environment, conventional RFID readers cannot locate the RFID tags with acceptable precision. Furthermore, conventional systems cannot track the three dimensional movement of RFID tags with any precision, if at all.

Therefore, it is an object of the invention to provide a system and method(s) that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
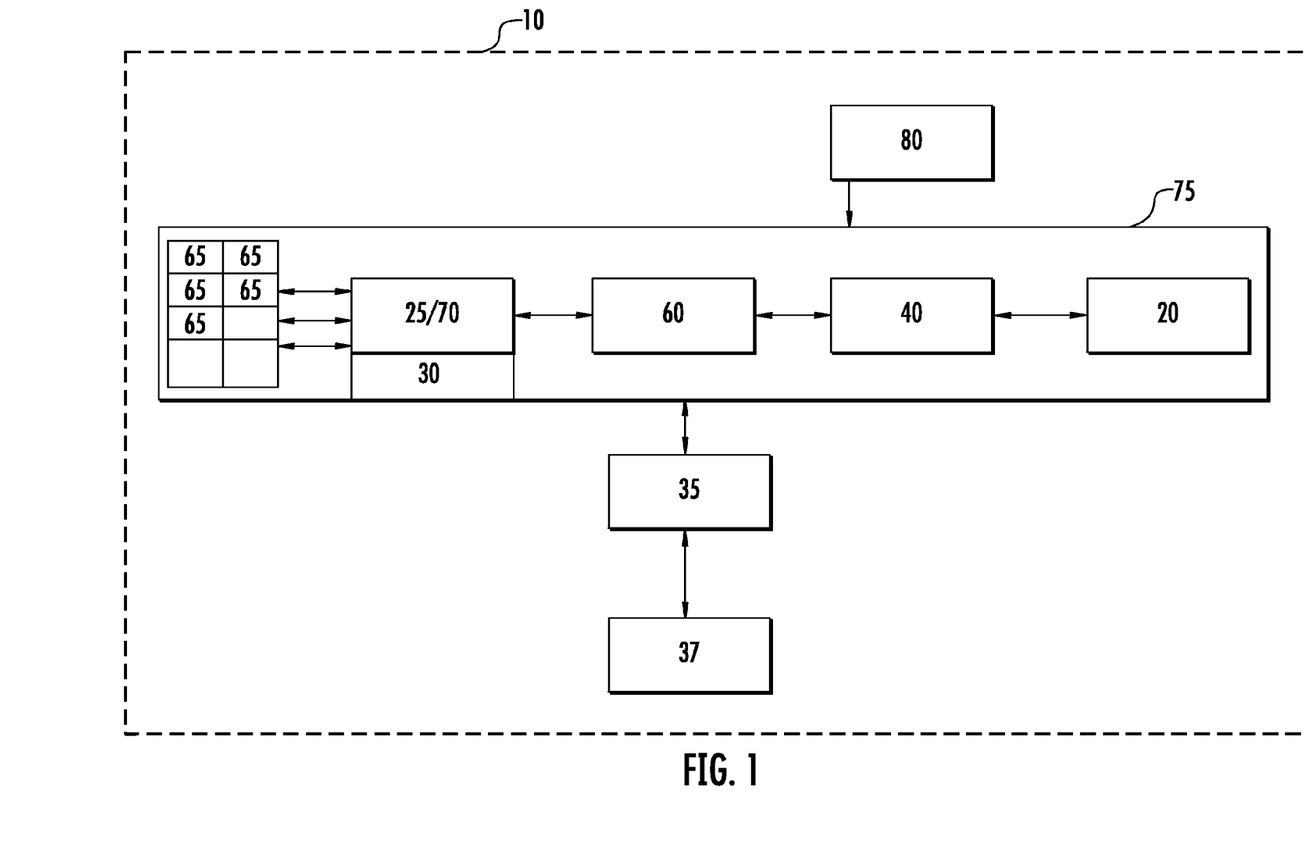
FIG. 1 is an exemplary top level system block diagram of an ITCS with a single SASL.
Figure 2:
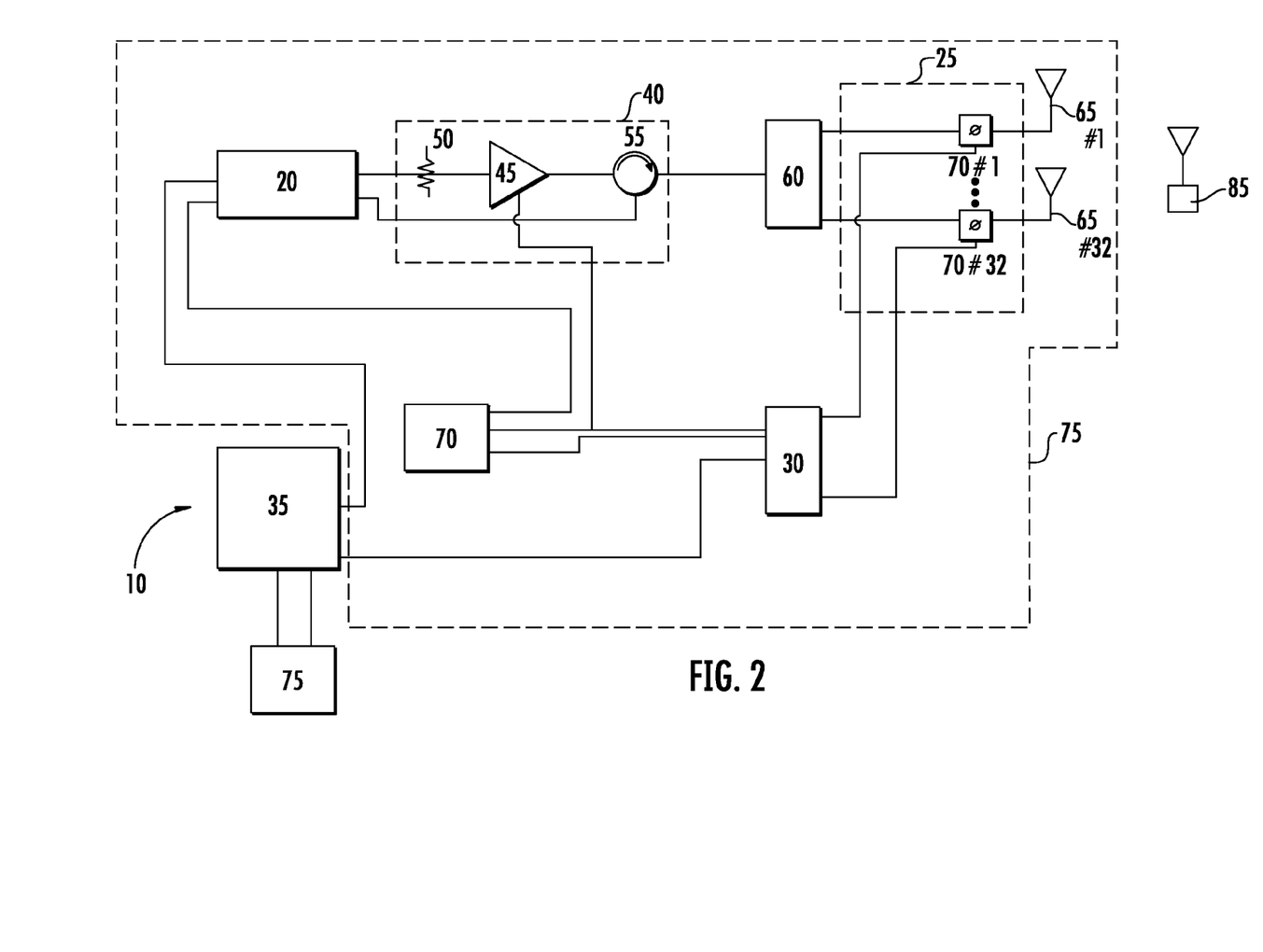
FIG. 2 is an alternative exemplary system diagram illustrating communications and or signal interconnections of an ITCS including two SASL. One of the SASL showing exemplary internal connections, the other provided in only block form.
Figure 3:
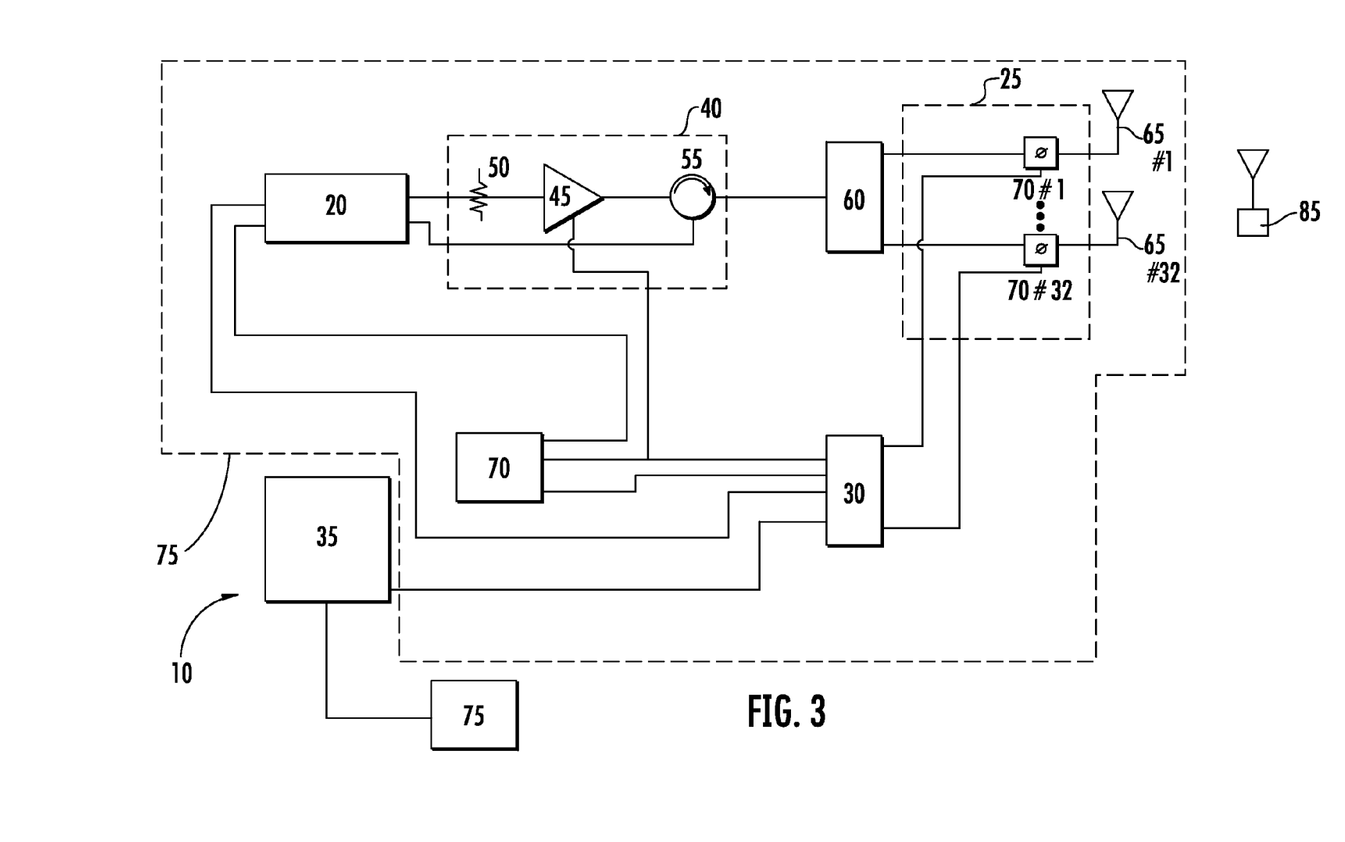
FIG. 3 is an alternative exemplary system diagram illustrating communications and or signal interconnections of an ITCS including two SASL with direct interconnection between the RFID reader and the control computer. One of the SASL showing exemplary internal connections, the other provided in only block form.

The inventor has developed an RF signal intelligent tracking and control system (ITCS) 10, for example as generally shown in FIG. 1 and in higher detail in FIGS. 2 and 3, including a phase array steerable antenna 15; an RFID reader 20 in operative communication with the phase array steerable antenna 15; a beam steering unit (BSU) 25, in operative communication with the phase array steerable antenna 15; a BSU controller 30 in operative communication with the BSU 25; and a control computer 35 in operative communication with the BSU controller 30. An operator interface 37, such as a display and or control panel may be coupled to the control computer 35. The operator interface 37 may be local to the installation or remotely coupled, via a proprietary network and or the internet.

The phase array steerable antenna 15 is comprised of at least one antenna element 65, for example a circularly polarized patch antenna element 65, and preferably includes a plurality of circularly polarized patch antenna element(s) 65, for example 32 antenna element(s) 65. At least one of the antenna element(s) 65 is configured as an independently controllable channel.

An amplification sub system 40 including, for example, an amplifier 45, attenuator 50 and circulator 55 may be applied between the RFID reader 20 and a power splitter 60 coupled to the individual antenna element(s) 65 of the phase array steerable antenna 15 to drive the interrogation signal at a desired power level and wave format.

The BSU 25 may include control circuitry driving a plurality of individual phase shifter(s) 70, the individual phase shifter(s) 70 coupled in-line between the power splitter/combiner 60 and the individual antenna elements 65 and or groups of the antenna elements 65, enabling antenna beam steering from the phase array steerable antenna 15 surface via purely electrical means.

The BSU 25 and the BSU controller 30 independently control the beam direction of each independently controllable channel, for example in more than one axis, and preferably the BSU 25 and the BSU controller 30 cooperate and control the phase array steerable antenna 15 in two axes.

The RFID reader 20 may be a single channel RFID reader. The RFID reader 20 generates a RF beam comprised of the independently controllable channel(s) capable of obtaining a response from or otherwise interrogating an RFID tag 85, such as via back scatter modulation, and thereby reading the RFID tag 85.

The RFID reader 20 generates the RF beam to obtain the response from the RFID tag 85 so as to calculate one and or each of a distance between the RFID tag 85 and a reference point; to calculate a direction between the RFID tag 85 and the reference point; to calculate and track a location relative to the RFID tag 85 and the reference point.

To improve manufacturing efficiencies, significantly simplify system installation and or for ease of system configuration, elements of the system may be integrated to form a signal acquisition and source location module (SASL) 75 that incorporates the phase array steerable antenna 15, beam steering unit 25 and beam steering controller 30 into a single module. Alternatively, the SASL 75 may also include the RFID reader 20 operative to transmit an interrogation signal beam on a desired frequency or frequency band and to receive one or more response signals on a desired frequency or frequency band via the phase array steerable antenna. The interrogation signal and response signal frequency(s) and or frequency band(s) may be configured to a common frequency or frequency band according to the signal parameters the system is configured for use with.

Figure 4:
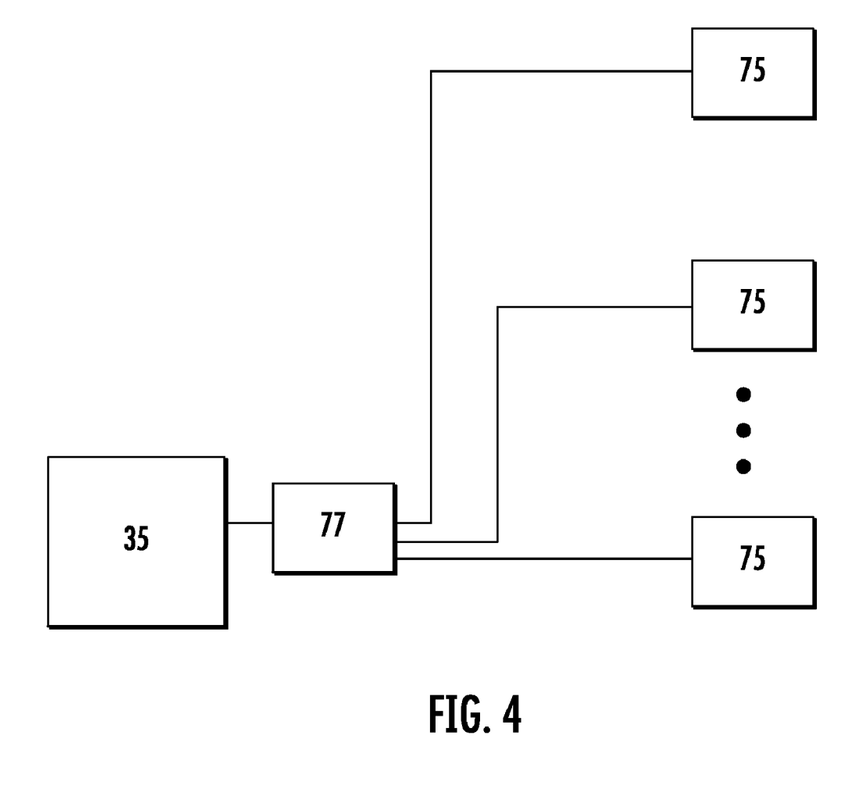
FIG. 4 is an exemplary block diagram of a multiple SASL configuration.

An ITCS 10 may include one or more spaced apart SASL 75 arranged, for example at a ceiling or other elevated location, to face a desired target area, as shown for example in FIG. 4, each of the SASL 75 communicating with and being controlled by the control computer 35 over a control and or data communications link. Where multiple SASL 75 are used, the communications link with the control computer 35 may be established with the assistance of a network switch 77 or router, such as an Ethernet 10/100/1000 MB network switch.

A power supply 70 configured to supply desired power levels to individual power consumers of the system may be integrated within the SASL or alternatively remotely mounted. The power supply 70 may be applied as a single centralized unit providing a range of different voltages to the various consumers or alternatively as a plurality of discrete power supplies each dedicated to generating a desired power level for each consumer.

The phase array steerable antenna 15 launches a steerable signal beam that may be configured for a narrow and or focused beam pattern. Once an ITCS 10 is calibrated for a specific installation configuration and operating environment, the three dimensional coordinates of the signal beam are known. Via location triangulation, measurement of return signal strength indication and or response times between launching of the interrogation signal(s) and detecting a backscatter modulation signal or other response from an RFID tag 85, the ITCS permits the operator thereof to find RFID tag(s) 85 in three dimensions, in time.

In one embodiment of the system of the present invention, a single channel RFID reader 20 interrogates the RFID tag(s) 85 via a directional beam of the phased array steerable antenna 15 while a BSU 25 controls the beam direction. The beam may be controlled in two axes by an array of antenna elements 65 such as, for example, circularly polarized patch antennas. The direction of the beam being formed may be based on the general orientation of the phase array steerable antenna 15 and more finely via a relative phase of each signal from the RFID reader 20 to the various individual antenna element(s) 65 of the phase array steerable antenna 15, and each of the channels is independently controllable via the BSU 25. The BSU Controller 30 commands the RFID reader 20 to interrogate the RFID tag(s) 85 by generating the protocol specific for the particular RFID radio frequency waveform of the target RFID tag(s) 85. The waveform may be transmitted through an attenuator 50 and or power amplified via an amplifier 45 to provide a predetermined power level to each phase array steerable antenna 15.

The control instructions for and or signal data received by the RFID reader 20 may be communicated via a network data communications link such as Ethernet or and a direct connection serial communication protocol such as RS-232 directly between the RFID reader 20 and the control computer 35 or alternatively between the RFID reader 20 and the control computer 35 via the BSU controller 30.

Capabilities and or applications of the ITCS 10 include the three dimensional spatial location of one or more RFID tag(s) 85; tracking of RFID tag(s) 85 via two or more antennas; tracking RFID tag(s) 85 in motion, for example along a moving conveyor belt; and, track and triangulate tags throughout a space, for example throughout an office or public space, backroom area of a warehouse, retail establishment or the like.

Figure 5:
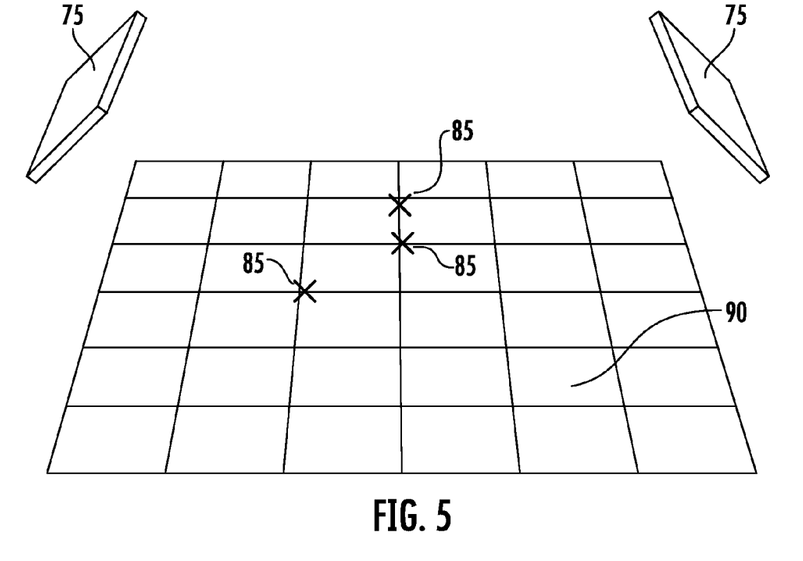
FIG. 5 is an exemplary diagram showing multiple SASL oriented to face a common operating environment.
Figure 6:
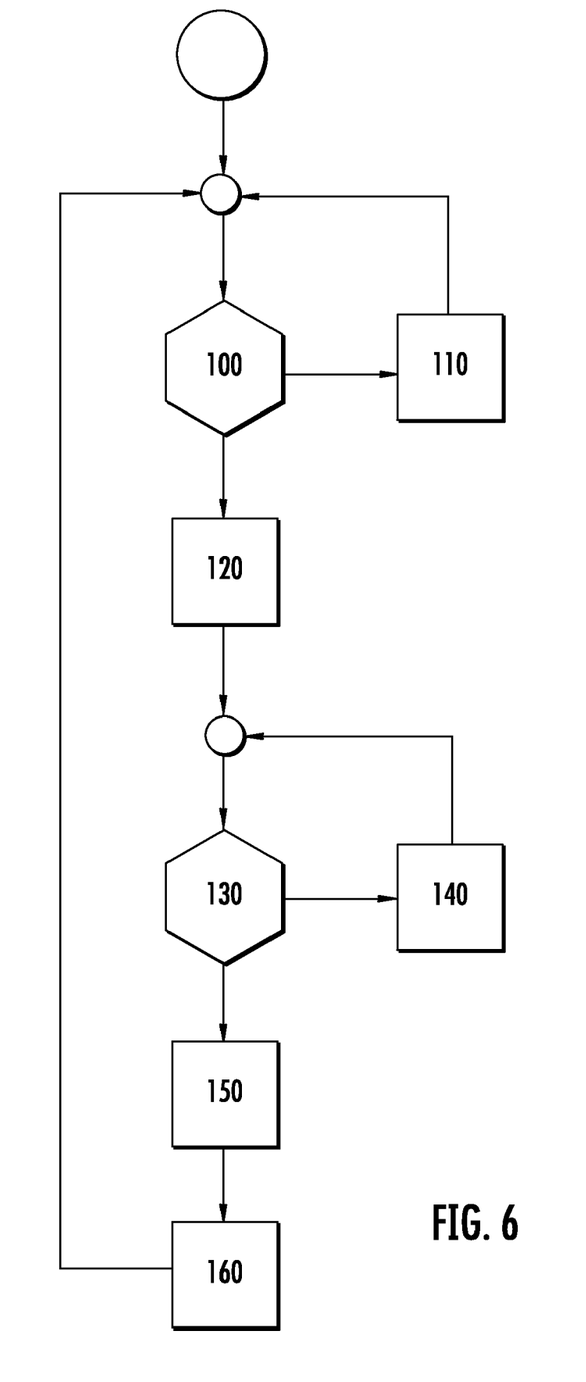
FIG. 6 is an exemplary method diagram for RFID location using an ITCS with at least two SASL.

An ITCS 10 including at least first and second SASL 75, as shown for example in FIG. 5, may be operated according to an exemplary method as shown in FIG. 6. After configuration to the operating environment 90 for example by recording signal responses from sample RFID tags positioned at a range of known locations and distances across the desired operating environment 90, the operating environment 90 may be divided into a matrix of antenna beam direction vectors which when successively stepped through one after another results in a full scan of the operating environment 90.

With configuration to the operating environment 90 completed, the operating environment 90 may be scanned by a first steerable signal beam interrogation signal from a first SASL 75. To perform a scan, the antenna signal beam is stepped incrementally through each of the direction vectors, in step 100. Any RFID tag response signals received at each direction vector is stored in a data matrix including, for example, a direction vector (theta1, phi1) of the first steerable signal beam when each response signal is received, an identification of the RFID tag providing the response signal and a return signal strength indicator (RSSI), at step 110. Alternatively and or additionally, the data matrix may include signal-timing data, such as a time delay between launch of the interrogation signal and reception of each response signal.

Calculations based upon the data matrix received signal data enables generation of an estimated location of each RFID transponder, for example in global coordinates, at step 120, also stored in the data matrix. For example, where the direction vector of the interrogation signal that resulted in the strongest RSSI from a single RFID tag is known, the RSSI associated with that direction vector for the single RFID tag may be compared to values obtained during system configuration to identify a distance along the direction vector from the antenna, where the RFID tag is expected to be. Signal timing data, if available, can be similarly applied to estimate the position of the RFID tag along the direction vector.

For each estimated location of an RFID tag obtained in step 120, a second SASL 75 may be directed to scan a subset area of the second SASL 75 operating environment 90, in step 130, the selected subset centered, for example, upon the estimated location translated to the second SASL 75 direction vector(s) by conjugate pairing upon the global co-ordinates defined with respect to the first SASL 75 in step 120. Alternatively, the selected scan subset area may be along a widened path of the associated direction vector of the first SASL 75, or a portion thereof guided by the RSSI value distance from antenna estimation. The scan results of the subset area are similarly processed into a data matrix in step 140.

Because the second SASL 75 scans a subset of its operating environment 90, guided by the first SASL 75 result, the number of direction vectors stepped through and thus the overall scan time is significantly reduced.

After each of the RFID tag estimated location subset scans of step 130 are completed, two estimated locations for each RFID tag have been stored into a data matrix. Triangulation calculations based upon the positions of each SASL 75 and the direction vector of each when obtaining the highest RSSI may be performed to obtain another estimated location of each RFID tag, at step 150.

A comparison between the three calculated positions of each RFID tag that has been obtained may be used to generate a reliability factor for the position result and or generate a final averaged position of each RFID tag for output to the user and or further processing, at step 160, whereupon the system returns to step 100 to perform another scan sequence.

The results of further scan sequences may be applied wherein the interrogation signal(s) are simultaneously directed at global coordinates of likely RFID tag response signal origin locations to confirm projected tag locations with the benefit of a focused interrogation beam from each of the multiple SASL 75.

As the data matrix is updated and projected tag locations stored with respect to ongoing scans, changes in projected tag locations may be analyzed to identify RFID tags that are in motion, including speed and direction. Error correction may be applied to the data matrix origin location patterns, such as iterative weighted robust least squares estimation to improve the accuracy of trajectory estimates, from which directional tracking may be derived via derivatives of the trajectory results.

Analysis of the results stored in the data matrix may be performed, for example with respect to maximum RSSI value and or a time of signal reception associated with each response signal having the same RFID tag identifier that is received, to identify and flag pseudo emitter signal responses, for example generated by reflections of the actual signal response that travel farther and thus arrive later and with a lower RSSI, within the operating environment 90.

By focusing the directional antenna signal beam(s), including applying interrogation signals from multiple SASL(s) 75 upon a common coordinate in space, the RFID tag(s) can also be communicated with at increased distances, without exceeding allowable power levels.

It is known and understood by those of ordinary skill in the art that, as used herein, references to the tracking of RFID tag(s) 85 encompasses the tracking of items, including retail items, which have been affixed with or otherwise physically associated with an RFID tag 85.

An alternative method of locating and tracking an RFID tag 85 includes, the following steps: providing a phase array steerable antenna 15; providing an RFID reader 20 in operative communication with the phase array steerable antenna 15 and capable of generating a protocol specific RFID RF waveform; providing a BSU 25 in operative communication with the phase array steerable antenna 15; providing a beam steering unit controller 30 in operative communication with the beam steering unit 25; providing a control computer 35 in operative communication with the beam steering unit controller 30; generating a RF beam; and, generating a response, reading and or interrogating an RFID tag 85.

Further additional and or alternative steps that may each be separately included in the above method may include transmitting the protocol specific RFID RF waveform through an attenuator 50 and or power amplifier 45; creating an RF beam, the RF beam preferably having maximum allowable power at the phase array steerable antenna 15. Queries may be made via RFID reader 20 under the control of the control computer 35; controlling at least one operative controllable channel independently; operating the beam steering unit 25 and the beam steering unit controller 30 cooperatively to direct the signal beam of the phase array steerable antenna 15 in more than one axis, and preferably comprises controlling the phase array steerable antenna 15 in two axes.

Additional steps related to locating the RFID tag 85 based upon the response may include calculating a distance between the RFID tag 85 and the reference point and or tracking sequential location(s) of the RFID tag 85 relative to the reference point.

Additional steps related to directionality of the RF beam may include controlling the BSU 25 with the BSU controller 30; controlling the RF beam with the BSU 25 so as to control the direction of the RF beam; controlling the physical orientation of the phase array steerable antenna 15; providing communication between the beam steering unit controller 30 and the control computer 35 via Ethernet; and or providing communication between the beam steering unit controller 30 and the RFID reader 20 via a serial communications protocol such as RS-232.

Additional steps related to an at least two phased array steerable antenna 15 embodiment wherein RFID tag data is associated with Electronic Price Codes (EPC's) includes: calibrating the at least two phase array steerable antennas 15 to optimally align the antennas 15 with known global coordinates; configuring an RFID reader 20 to the nature of its working environment; performing a two-dimensional raster scan of a visible area with one antenna 15; calculating a minimal covering of the visible area with one or more beam areas; defining a set of steering directions for raster scans; using the one antenna to determine if one or more RFID tags are present in the beam areas; saving a list of EPC's; estimating an expected location for at least one RFID tag in the one or more beam areas; projecting the expected location of the RFID tag into global coordinates; estimating the most probable conjugate pairing ("PGPt1"); calculating a most likely location of the RFID tag's projection in global coordinates relative to the other antenna ("PGPt2") using an estimated random distribution of RFID tag heights and PGPt1; calculating a projection in global coordinates inverse of PGPt2 so as to yield a most probable steering direction for the other antenna; reading with the other antenna in the direction indicated by a plane point projection of PGPt2; triangulating any RFID tag seen by the other antenna using PGPt1 and PGPt2; triangulating using PGPt1 and PGPt2 if the RFID tag is not seen by the other antenna, as this location is still highly probable as a location for the RFID tag; and, repeating these steps for each beam area.

The above embodiment may further comprise post-processing with respect to stored intermediate and or historical data as needed, such as: estimating a time range over which the RFID tag was seen using data collected for the RFID tag; fitting a model to (x,y,z,t) data produced by conjugated raster scans using, for example, Iterative Weighted Robust Least Squares Estimation; calculating an RFID tag trajectory over the time interval t using an estimated model of the RFID tag's motion; and, tracking the RFID tag's direction using derivatives of the RFID tag trajectory.

In an embodiment of the present invention the phase array steerable antenna(s) 15 and RFID tag may communicate at a distance of over twenty feet, preferably at a distance of over forty feet, more preferably at a distance of over fifty feet, and even more preferably at a distance of over sixty feet.

It is understood by those of ordinary skill in the art that certain regulatory authorities have set standards and regulations regarding maximum allowable power to certain types of antennae, such agencies including but not limited to the Federal Communications Commission ("FCC"). While the FCC promulgates such regulations, those regulations are not limiting herein, and the present invention explicitly encompasses all suitable values of power.

It is known and understood by those of ordinary skill in the art that, as used herein, references to beam areas and or patterns may include ellipses, which may encompass circles. Further, the beam pattern(s) may have a shape other than an ellipse.

One skilled in the art will recognize that the present invention provides numerous advantages, besides the method(s) of operation herein above, including the ease of installation and greatly simplified power and or communications interconnection requirements provided by the SASL 75 according to the invention.

Another advantage of the present invention is flexibility realized by the ease with which multiple SASL 75 may each be utilized under the direction of a central control computer 35 to increase the size of the overall area being monitored, to provide additional data points for improving the accuracy of the triangulation calculations and also to increase the number of interrogation signals and thereby the resulting signal power level that may be focused upon a single point in space.

Still another advantage of the present invention is to provide the combination of a steerable phase array antenna and an RFID reader to generate a radio frequency ("RF") to interrogate and read RFID tags, to achieve significantly improved multipath immunity.

Table of Parts

| | |
|---|---|
| 10 | intelligent tracking and control system |
| 15 | phase array steerable antenna |
| 20 | RFID reader |
| 25 | beam steering unit |
| 30 | beam steering unit controller |
| 35 | control computer |
| 37 | operator interface |
| 40 | amplification subsystem |
| 45 | amplifier |
| 50 | attenuator |
| 55 | circulator |
| 60 | power splitter/combiner |
| 65 | antenna element |
| 70 | phase shifter |
| 75 | signal acquisition and source location module |
| 77 | network switch |
| 80 | power supply |
| 85 | RFID tag |
| 90 | operating environment |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A method of locating and tracking an RFID tag in an environment in which
   Electronic Price Codes are used, the steps comprising:
   calibrating at least two phase array steerable antennas to optimally align the antennas with known global coordinates;
   configuring an RFID reader for a working environment;
   performing a two-dimensional raster scan of a visible area of the working environment with a first antenna;
   calculating a minimal covering of the visible area with one or more beam areas;
   defining a set of steering directions for raster scans;
   using the first antenna to determine if one or more RFID tags are present in the beam areas;
   saving a list of electronic price codes;
   estimating an expected location for at least one RFID tag in the beam area; projecting the expected location of the RFID tag into global coordinates; estimating the most probable conjugate pairing ("PGPt1");
   calculating a most likely location of the RFID tag's projection in global coordinates relative to a second antenna ("PGPt2") using an estimated random distribution of RFID tag heights and PGPt1;
   calculating a projection in global coordinates inverse of PGPt2 so as to yield a most probable steering direction for the second antenna;
   reading with the other antenna in the direction indicated by a plane point projection of PGPt2;
   triangulating any RFID tag seen by the other antenna using PGPt 1 and PGPt2;
   triangulating using PGPt1 and PGPt2 if the RFID tag is not seen by the other antenna, as this location is still highly probable as a location for the RFID tag; and repeating these steps for each beam area.

2. A method according to claim 1, further comprising:
   estimating a time range over which the RFID tag was seen using data collected for the RFID tag;
   fitting a model to (x,y,z,t) data produced by conjugated raster scans using Iterative Weighted Robust Least Squares Estimation;
   calculating an RFID tag trajectory over the time interval t using an estimated model of the RFID tag's motion; and
   tracking the RFID tag's direction using derivatives of the RFID tag trajectory.

3. A method of locating and tracking an RFID tag, comprising the steps of:
   scanning an operating environment with a first steerable signal beam interrogation signal from a first phase array steerable antenna;
   storing RFID tag response signals in a data matrix including a direction vector of the first steerable signal beam when each response signal is received and an identification of the RFID tag providing the response signal;
   scanning a subset area of an operating environment of a second steerable signal beam interrogation signal from a second phase array steerable antenna;
   storing RFID tag response signals in a data matrix including a direction vector of the second steerable signal beam when each response signal is received and an identification of the RFID tag providing the response signal;
   analyzing the data matrix to identify and flag any pseudo emitter response signals that are received;
   the pseudo emitter response signals being any signal within a group of response signals having a common identification that are not the response signal with the shortest time between the interrogation signal launch and reception of the response signal; and
   triangulating a response signal origin location for each response signal where the identification is the same.

4. The method of claim 3, wherein the data matrix resides in a control computer.

5. The method of claim 3, wherein the data matrix for each response signal includes a time of reception.

6. The method of claim 3, wherein successive scans over time are each stored in the data matrix.

7. The method of claim 3, wherein a return signal strength indicator associated with each response signal is stored in the data matrix.

* * * * *